Figure 1:
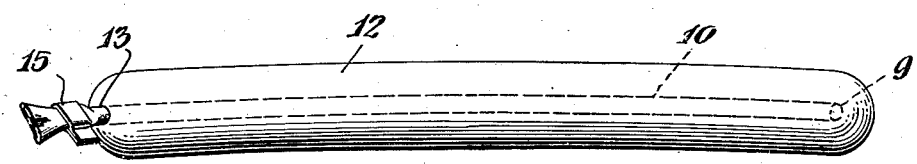

May 6, 1941.  W. F. SERR  2,240,522
FOOD PRODUCT
Filed Dec. 6, 1939

INVENTOR
William F. Serr
BY
Albert M. Austin
his ATTORNEY

Patented May 6, 1941

2,240,522

UNITED STATES PATENT OFFICE 2,240,522

FOOD PRODUCT

William F. Serr, New York, N. Y., assignor to Yankfrank, Inc., New York, N. Y., a corporation of New York Application December 6, 1939, Serial No. 307,759

6 Claims. (Cl. 99—176)

This invention relates to food products and more particularly to frankfurters, sausages and the like.

When frankfurters are served individually with rolls or bread in the form of sandwiches, it is common practice to serve mustard or some other condiment or seasoning with them. It has been customary to spread the mustard on the outside of the frankfurter or on the roll or bread which accompanies it. Very often the mustard drips off to soil the hands or clothing of the person handling the sandwich. Moreover, the appearance of the sandwich when the mustard is served in this manner is often unpleasant. Nevertheless, many enjoy the flavor imparted to the frankfurter sandwich by the addition of such a condiment or seasoning.

The present invention has for one of its purposes the provision of a frankfurter or other similar food product which may be seasoned by the addition of a condiment such as mustard or the like to the inside of the frankfurter uniformly along its length thus avoiding smearing on the outside as has been the common practice.

Ordinarily, the mustard which is served with frankfurters is the so-called prepared mustard which is a thick viscous liquid or is in a flowable semiplastic condition. According to the invention, the mustard may be carried in a small collapsible tube or casing which may be placed longitudinally into the interior of the frankfurter with its inner end terminating within the frankfurter but left open. The meat of the frankfurter is such as to form a seal over the inner open end. The opposite end of the tube or casing is caused to protrude from the end of the frankfurter and is sealed to maintain the mustard within the tube. Hence, the mustard accompanying the frankfurter may be kept separate from the meat. When the frankfurter is served to the person who is to eat it and he does not desire the added flavor of mustard, he may withdraw the inner tube or casing together with the mustard in it and thus leave the frankfurter in its natural unseasoned state. On the other hand, if the person who is to eat the frankfurter desires the added flavoring of mustard, he may, according to the invention, withdraw the inner casing or tube and at the same time, with facility, extrude the mustard from the casing uniformly along the interior of the frankfurter with consequent avoidance of undesirable messiness and smearing on the outside. The protruding end of the casing provides convenient means for withdrawal of the casing.

It will be understood, of course, that meat products of this type are seasoned with certain condiments, in any event, but the added seasoning here referred to is mustard or the like which has customarily been added at the time the frankfurter is served or eaten.

To accomplish these desirable ends the small collapsible tube containing the mustard may be of edible cellulosic material, if desired. Material such as used in making viscose sausage casings is suggested as one suitable form of collapsible mustard casing. It may be produced in relatively long lengths and may be cut to any desirable short lengths.

For purposes of description, the tube containing the mustard is referred to herein as an inner casing. The casing in which the meat is stuffed is referred to as an outer casing. According to present practice, the outer casing may be the well-known intestinal casings from animals or manufactured viscose casings which may or may not be left on the frankfurters after they are stuffed, cured and smoked.

The inner casing which is to contain the mustard may be inserted into individual frankfurters after they are cured and smoked. This may be done by the manufacturer, or intermediate seller or by the person who dispenses or serves them. In each case the frankfurter finally is provided with a meat filling into which extends a mustard-containing inner casing closed at its inner end by the meat stuffing. The opposite end of the casing is left protruding from the frankfurter and may be sealed. It may be cooked in the usual manner and when served, the person who is to eat it may consume the mustard or remove it from the frankfurter as he sees fit.

Figure 2:
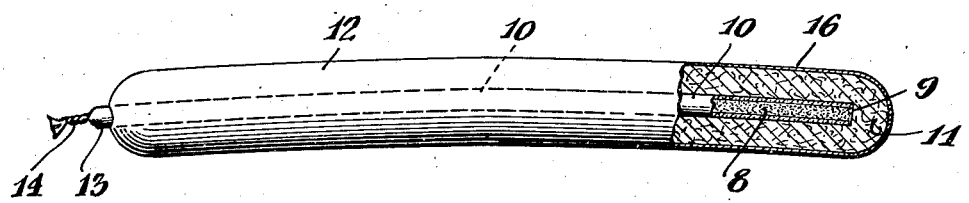

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a side view in elevation of a frankfurter made according to the invention; and Fig. 2 is a side view in elevation partly in cross section showing the inner end of the inner casing terminating within the meat portion of the frankfurter and closed thereby.

Like reference characters denote like parts in the several figures of the drawing. In the following description and in the claims, various details will be identified by specific names for convenience, but they are intended to be as generic in their application as the art will permit.

Referring now to the drawing, the inner casing 10 for a single frankfurter comprises a collapsible tube or casing which extends longitudinally through substantially the entire length of the frankfurter. The inner end 9 of the casing 10 is left open but sealed by the meat portion 11 of the frankfurter 12. The inner casing should be of restricted cross section, and preferably substantially less than the cross section of the frankfurter itself. It may contain mustard 8 of suitable extrudable consistency, or may contain other desirable seasoning. The outer end 13 of the inner tube or casing may be sealed off, such as shown at 14, by twisting or by any suitable sealing method such, for example, as by tying off. Or the outer end 13, which is left protruding from the frankfurter, may be sealed with a clip 15 or like device.

The individual inner casing may be inserted into the frankfurter 12 after boring or reaming a longitudinal hole into the smoked frankfurter. It will be observed that the cross section of the hole should be of suitable dimension to accommodate the inner casing and it should terminate short of the end of the frankfurter.

After the inner casing 10 is inserted longitudinally into the frankfurter the end 13 will be left protruding. The mustard may be charged into the inner tube either before or after it is inserted in the frankfurter. Thus, there may be formed a frankfurter having an outer casing 16 enclosing the stuffing or meat 11 in elongated shape having an inner casing 10 of restricted cross section containing mustard and extending longitudinally therein and having the mustard distributed substantially uniformly throughout its entire length but within the inner casing 10. It will be understood, however, that some frankfurters—the so-called skinless type—do not have a separate outside casing when sold but usually they have a thin integument around them as a result of the curing and smoking means used in their manufacture.

The frankfurter thus formed may then be cooked or grilled in customary fashion. The person to whom it is served may then consume the frankfurter with or without the mustard as he desires. If he prefers not to have the added flavoring of the mustard, he may manually withdraw the inner tube 10 by grasping the protruding end 13. By merely pulling out the tube by grasping the protruding end without squeezing the tube to extrude the mustard, the mustard will be removed with the casing since no air will enter the sealed end 13 and the mustard will remain in the tube as it is withdrawn.

On the other hand, if he desires the mustard flavoring, he may grasp the protruding end 13 of the inner tube and withdraw it while simultaneously pinching or otherwise collapsing the tube near the same end of the frankfurter. This will cause the mustard to be extruded from the opposite end 9 of the inner tube 10 as it moves longitudinally along the interior of the frankfurter. Accordingly, the mustard will be distributed substantially uniformly along the length of the frankfurter. Consequently, the necessity of smearing mustard on the outside of the frankfurter is eliminated and this is particularly desirable when the frankfurter is served with a roll as is common practice at public dispensaries.

Or, if desired, a small vent hole may be punched in the protruding end 13 of the inner tube. When the tube is withdrawn, air will be permitted to enter the tube. Since substantially no air can enter the tube except through the vent, there is sufficient suction within the frankfurter as the tube is withdrawn to cause the mustard to be retained within it and distributed throughout substantially its entire length.

Inasmuch as the inner casing may be made of edible material, it may in some instances be more convenient and desirable not to remove the inner casing at all. Nevertheless, the mustard will be uniformly distributed along the length of the frankfurter and the added flavoring may none the less be enjoyed.

If desired, a shield or clip 15 which may be of paper, metal, or other suitable material may be placed over the protruding end 13 of the casing 10 to seal it. Such a clip will be useful in avoiding any soiling of the hands when the inner casing 10 is withdrawn from the frankfurter to extrude the mustard into the frankfurter.

It will be understood that the invention has been described with reference to the use of mustard in the inner casing. It will now be apparent that other forms of seasoning may be utilized in the inner casing and furthermore such an inner casing may be adapted for like purposes with other similar forms of food products.

While certain novel features of the invention have been disclosed and are pointed out in the annexed claims, it will be understood that various omissions, substitutions and changes may be made by those skilled in the art without departing from the spirit of the invention.

This application is a continuation in part of my copending application Serial Number #229,648 filed September 13, 1938. (See Patent No. 2,186,435, granted January 9, 1940.)

What is claimed is:

1. A comestible comprising a mass of food product and a quantity of flavoring material enclosed in an elongate casing enclosed substantially entirely within said mass of food product and having an open end closed by said food product and its opposite end protruding from said mass of food product to provide means for convenient withdrawal of said casing from said mass.

2. A food product comprising a stuffing of meat in elongated form, a collapsible hollow casing of substantially lesser cross section than said elongated meat portion extending longitudinally substantially through the interior of said meat portion, said inner casing being adapted to receive a seasoning material and maintain said seasoning material separate from said meat and having an open end closed by said meat portion and its opposite end protruding from said meat portion.

3. A food product comprising a meat portion in the shape of a frankfurter, a collapsible hollow inner casing of transverse cross section less than the transverse cross sectional area of said meat portion extending into said meat portion and terminating within said meat portion and closable at its inner end by said meat portion, and a filling of seasoning material within said inner casing and maintained separate from said meat portion by said casing, said casing having a portion protruding from said meat portion providing means for convenient removal of said casing from said meat portion.

4. A food product comprising a meat portion in elongated form, a hollow casing extending longitudinally into and terminating with said meat portion, a filling of extrudable seasoning material within said casing, said hollow casing being of collapsible material and adapted to be collapsed manually and withdrawn from said meat to extrude the said filling substantially uniformly throughout substantially the entire length of said meat portion.

5. A food product comprising a meat portion in elongated form, a hollow casing extending longitudinally into and terminating in the interior said meat portion, said casing having a portion protruding from said meat portion, a filling of extrudable seasoning material within said casing, the protruding end of said casing being closed to hold said filling therein, said hollow casing being of collapsible material and adapted to be collapsed manually and withdrawn from said meat to extrude the said filling substantially uniformly throughout substantially the entire length of said meat portion.

6. A food product comprising a meat portion in elongated form, a hollow casing extending longitudinally into said meat portion having an open end terminating therein and having a sealed portion protruding from said meat portion, a filling of extrudable seasoning material within said casing, said hollow casing being of collapsible material and adapted to be collapsed manually and withdrawn from said meat to extrude the said filling substantially uniformly throughout the length of said meat portion and a clip about the protruding portion of said casing to collapse said casing to cause the filling to be extruded from said casing into said meat portion when said casing is withdrawn from said meat portion.

WILLIAM F. SERR.